United States Patent [19]

Tanny et al.

[11] Patent Number: 5,312,233
[45] Date of Patent: May 17, 1994

[54] LINEAR LIQUID DISPENSING PUMP FOR DISPENSING LIQUID IN NANOLITER VOLUMES

[75] Inventors: Mark N. Tanny, Brownsville; Raymond A. LeBlanc; Douglas S. Bensley, both of Springfield; Vernon W. Zeitz, N. Springfield; John E. Barney, Springfield, all of Vt.

[73] Assignee: Ivek Corporation, North Springfield, Vt.

[21] Appl. No.: 22,832

[22] Filed: Feb. 25, 1993

Related U.S. Application Data

[63] Continuation of Ser. No. 841,146, Feb. 25, 1992, abandoned.

[51] Int. Cl.⁵ .............................. F04B 9/02; F04B 7/06
[52] U.S. Cl. ..................................... 417/316; 417/319; 417/410 R; 417/415; 417/492; 417/500
[58] Field of Search ............... 417/492, 500, 410, 415, 417/316, 319

[56] References Cited

U.S. PATENT DOCUMENTS

| | | | |
|---|---|---|---|
| 970,435 | 9/1910 | Dourte | 417/500 |
| 1,713,219 | 5/1929 | Eisenhauer | 417/415 |
| 2,643,614 | 6/1953 | Rosenkrans | 417/319 |
| 3,022,742 | 2/1962 | Bowen | 417/500 |
| 3,168,872 | 2/1965 | Pinkerton | 417/492 |
| 3,411,703 | 11/1968 | Zengel | 417/319 |
| 3,771,918 | 11/1973 | Winter | 417/319 |
| 4,326,837 | 4/1982 | Gilson | 417/415 |
| 5,015,157 | 5/1991 | Pinkerton et al. | 417/492 |

FOREIGN PATENT DOCUMENTS

| | | | |
|---|---|---|---|
| 2449332 | 10/1974 | Fed. Rep. of Germany | 417/500 |
| 158387 | 9/1984 | Japan | 417/500 |

OTHER PUBLICATIONS

"FMI Lab Pump" Brochure, FMI Fluid Metering, Inc. 1975, Entire Disclosure.

Primary Examiner—Richard A. Bertsch
Assistant Examiner—Roland G. McAndrews, Jr.
Attorney, Agent, or Firm—Sughrue, Mion, Zinn, Macpeak & Seas

[57] ABSTRACT

A rotary/reciprocating liquid dispensing pump for dispensing liquids in the nanoliter range has a narrow radial slot extending longitudinally from an end of a reciprocating, rotating cylindrical piston sliding in a smooth cylindrical bore of a pump housing at a closed end thereof, which slot extends outwardly to the periphery of the piston. The piston is selectively positioned in alignment with one of a plurality of circumferentially spaced small diameter radial passages within the housing opening directly to the cylindrical bore in the path of rotation of said slot. The ports thereof opening to the cylindrical bore are spaced circumferentially a distance in excess of the width of the slot. A linear liquid dispensing pump apparatus including such pump includes a stepping motor and an electromagnetic clutch/braking mechanism concentrically surrounding a lead screw, and the lead screw is threadably engaged with a stepping motor tubular rotor shaft. An anti-backlash assembly operatively couples the stepping motor tubular rotor shaft to the lead screw. The stepping motor is incrementally pulsed and the electromagnetic clutch braking mechanism energized for selective incremental rotation of the lead screw.

39 Claims, 3 Drawing Sheets

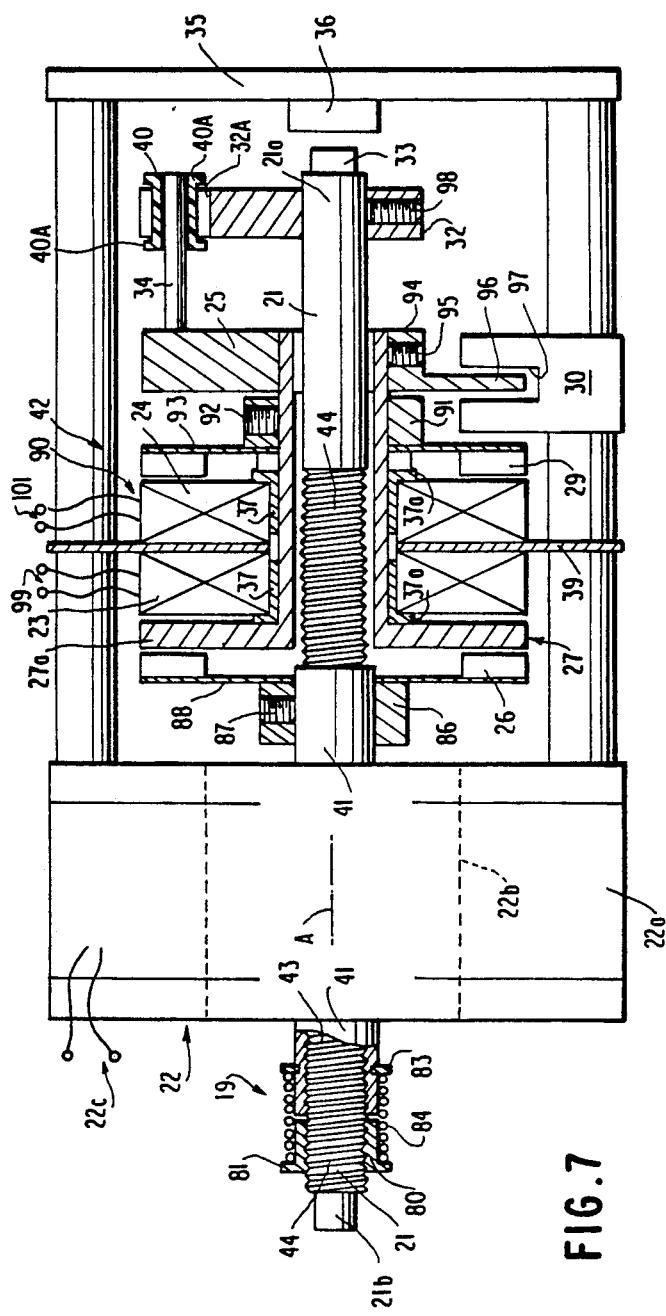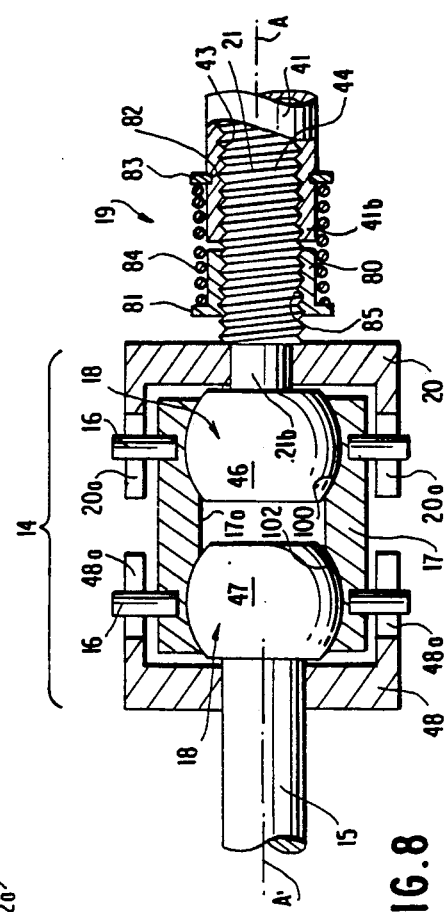

LINEAR LIQUID DISPENSING PUMP FOR DISPENSING LIQUID IN NANOLITER VOLUMES

This is a continuation of application Ser. No. 07/841,146 filed Feb. 25, 1992, now abandoned.

FIELD OF THE INVENTION

This invention relates to the dispensing of liquids in volumes of the nanoliter range and more particularly to the transfer of liquid from a source to a receiver at accurately controlled rates and volume through the use of an integral valve, positive displacement piston pump coupled to a precision rotary/linear motion actuator mechanism.

BACKGROUND OF THE INVENTION

Precision liquid delivery is an important function in the production and research of many products, especially for the medical and pharmaceutical industries. As in all equipment, ease of use and reliability, combined with accuracy, are extremely important in the successful performance of each application.

There are several main technologies which are commonly used in dispensing fluids. These include piston pumps, peristaltic pumps, time pressure systems, diaphragm pumps and gear pumps. Each of these technologies must incorporate some sort of valving technology along with a method for displacing fluid. It is generally understood that, in order to achieve accurate and reliable dispenses, positive displacement mechanisms have exhibited the best performance. Most positive displacement mechanisms incorporate out of phase check valves and a piston or other positive displacement mechanism to create suction and discharge.

Syringe pumps and rotary reciprocating pumps are most commonly used in the industry in order to accomplish small volume dispensing. The syringe pump utilizes check valves or other separate mechanical valving assemblies combined with a programmable stroke length adjustment. Due to the materials of construction and the fact that external valving is necessary, the pump is easy to use but often has long term reliability and priming problems.

Rotary reciprocating pumps, on the other hand, utilize the piston as an integral valving mechanism eliminating secondary valves, but incorporate a mechanical stroke length adjustment which is not for use by an operator. Additionally, both of these mechanisms typically incorporate one inlet and discharge connection as the maximum number of ports due to the design constraints of each mechanism.

It is therefore a primary object of the present invention to provide a rotary reciprocating positive displacement pump utilizing a rotary, reciprocating piston as an integral valving mechanism, which includes the benefit of multi-porting, and in which rotary shift of the piston and axial stroke length may be readily electronically adjusted, and in which the pump is self-priming, permits bubble clearing, and results in a fast and simple setup.

It is a further object of the invention to provide such rotary reciprocating pump, in which the dispensing resolution is reduced to nanoliter range, which is highly reliable in performance, and simple to use, and which may be instantaneously adjusted to dispense the same or other liquids at different dispensed volumes via the multi-porting feature.

BRIEF DESCRIPTION OF THE DRAWINGS

FIG. 7 is a enlarged view partially in section and partially broken away of the clutch/brake mechanism of the pumping apparatus of FIG. 1.

FIG. 8 is an enlarged view of the flexible shaft coupling of the pumping apparatus of FIG. 1.

DESCRIPTION OF THE PREFERRED EMBODIMENT

Figure 1:
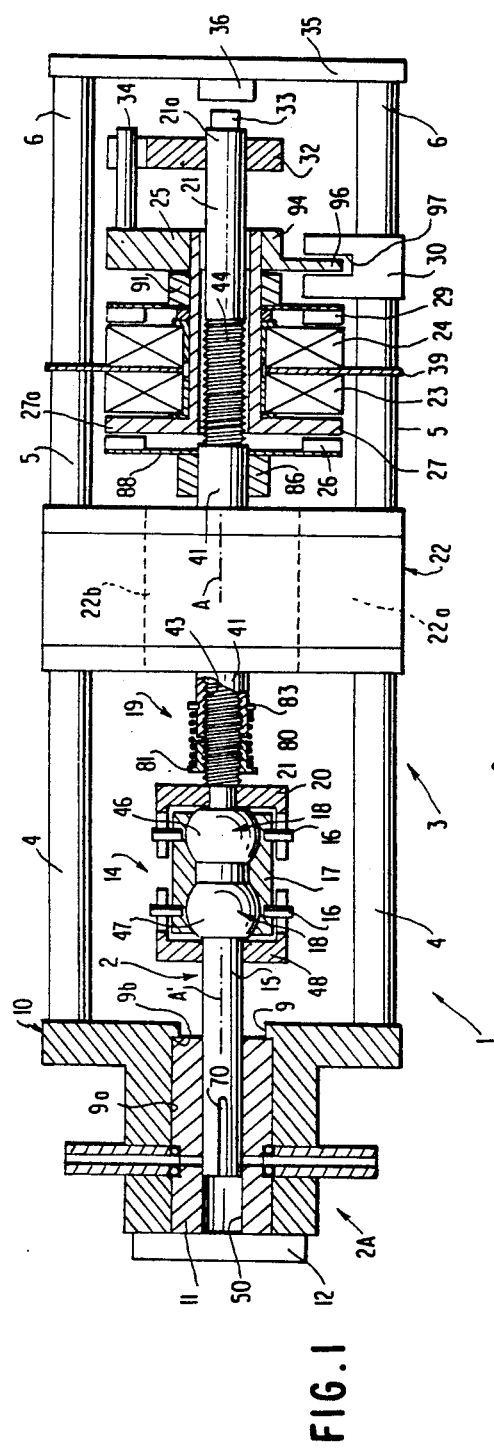
FIG. 1 is a longitudinal sectional view of a linear liquid dispensing pumping apparatus forming a preferred embodiment of the invention.

Referring to the drawings, FIG. 1 illustrates the preferred embodiment of the linear liquid dispensing pumping apparatus, indicated generally at 1, and comprising two principle components; an integral valve positive displacement piston pump indicated generally at 2, and a precision rotary/linear motion actuator mechanism 3 coupled thereto. The apparatus 1 functions to transfer fluids (liquids) from a source to a receiver at accurately controlled rates and volumes. Such apparatus 1 is designed for dispensing applications which require precision and reliability. The pumping apparatus 1 is employed in a precision dispensing system which utilizes the combination of solid-state electronics, a stepping motor drive and a multi valve port, positive displacement dispense head 2 applicable to a wide variety of dispensing parameters thereby producing a dispensing system which is extremely accurate, reliable and uniquely versatile. The apparatus 1 is capable of dispensing volumes in the nanoliter range with an accuracy of 0.1% or better. Such an apparatus is particularly useful in high speed application with dispense times less than thirty-five micro seconds being readily obtainable. The apparatus 1 utilizes digital electronics, solid-state sensors and integrates readily with a micro processor or like control with close loop feedback electronic circuitry to effect both velocity and volume control permitting the fast dispensing of minute liquid volumes in the nanoliter range.

The improved, highly versatile integral valve positive displacement piston pump 2 is a key element of the apparatus 1. It comprises a flanged cylindrical pump housing indicated generally at 10, coupled by means of a plurality of pump coupling standoffs 4, to one face of a centrally located stepping motor 22 and partially defining an open framework 3. In similar fashion, short standoffs 5, and long standoffs 6 form a further portion of the open framework structure of the apparatus 1, extending from the right side of the stepping motor 22, and being connected to a end plate 35 remote from motor 22. The pumping apparatus 1 may include a elongated sheet metal base (not shown) underlying the apparatus of FIG. 1, and supporting the same.

Figure 2:
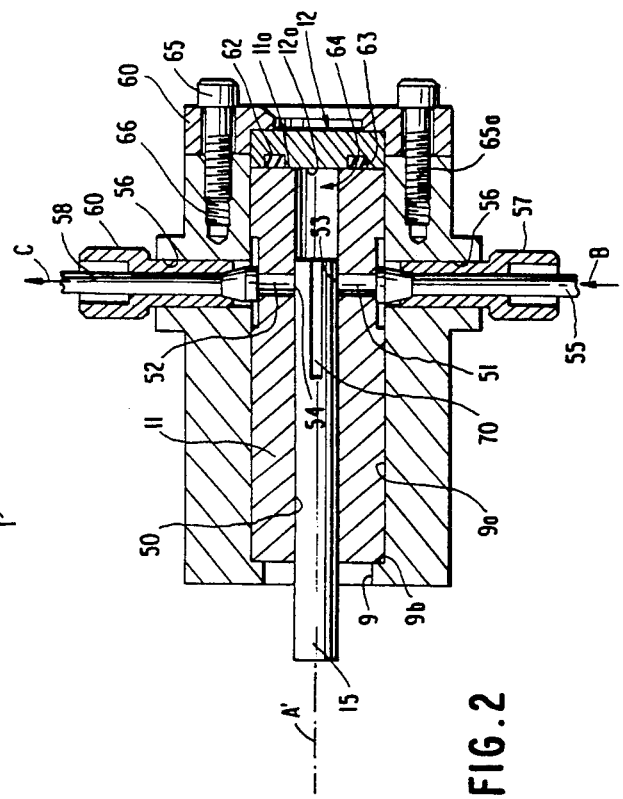
FIG. 2 is an enlarged, horizontal sectional view of the rotary reciprocating pump of the apparatus of FIG. 1.

As seen from FIG. 1, the flanged cylindrical pump housing 10 is provided with an axial bore 9 and a counter bore 9a. A cylindrical liner 11 is mounted within a counter bore 9a. Liner 11 abuts a shoulder 9b at one end, and is closed off by an end cap 12 at the opposite end. In turn, the cylindrical liner 11 is provided with a axial bore 50 which slidably and rotatably carries an elongated cylindrical piston 15. Diametrically opposed, small diameter radial passages at 51 and 52, are formed within the cylindrical liner 11 defining an inlet port 53 and outlet port 54 for the pump 2, as best seen in FIG. 2. A liquid supply line or tube 55, has an end thereof, terminating within radial passage 56 within the cylindrical pump housing 10 and, is sealably connected to the pump housing, by a tubular connection fitting 57. The axis of passage 56 is aligned with passage 51 within the cylinder liner 11. To the opposite side, an outlet line or pump delivery tube 58, is inserted within a diametrically opposite radial passage 56, of the cylindrical pump housing 10 and maintained and sealably connected thereto by connection fitting 60. The pump delivery tube 58 is thus aligned with passage 52 defining the outlet port 54 of the pump. In contrast to the schematic nature of FIG. 1, the enlarged sectional view of the integral valve/positive displacement piston pump of FIG. 2 shows the end cap 12 as a circular disk member having an outer diameter slightly less than the diameter of counter bore 9a of the cylindrical pump housing, being partially fitted therein, and partially received within a recess 61 within an annular clamping ring 60. Ring 60 forms an abutment shoulder and which maintains face engagement of the end cap 12 with end face 11a of the cylinder liner 11. The inside face 12a of the end cap 12 is provided with a circular groove 62 which receives a compressable O-ring seal 63 for sealing of pumping chamber 64 defined by piston 15, cylinder liner 11 and end cap 12. The clamping ring 60 is mounted to the end of the cylinder pump housing 10 by a series of circumferentially spaced screws 65 whose threaded shanks 65a are received within tapped holes 66 within the cylindrical pump housing 10.

Prior to discussing the makeup and operation of the integrated precision rotary/linear motion actuator mechanism 3, the manner in which fluid (liquid) pumping is accomplished may be readily seen by reference to FIGS. 3 through 6 inclusive.

FIGS. 3 through 6 inclusive are to a larger scale than that shown in FIG. 2, and from FIG. 2 it is noted that the liquid to be pumped enters the pumping chamber 64 from a liquid source as indicated schematically by arrow B, and a volume of the liquid from the source B is discharged from delivery tube 52 as indicated by arrow C.

Figure 3:
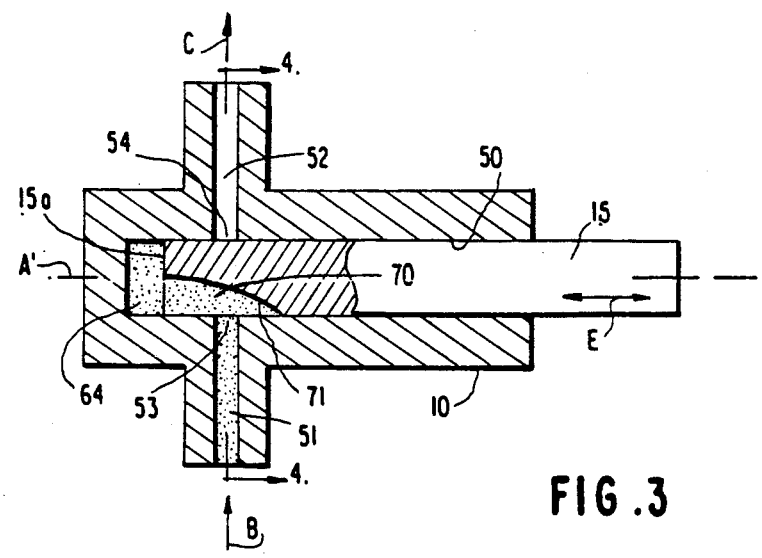
FIG. 3 is a schematic sectional view of the apparatus of FIG. 2, showing the valve open to intake.
Figure 4:
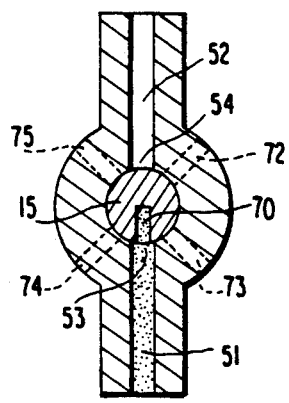
FIG. 4 is a sectional view taken about line 4—4 of FIG. 3.
Figure 5:
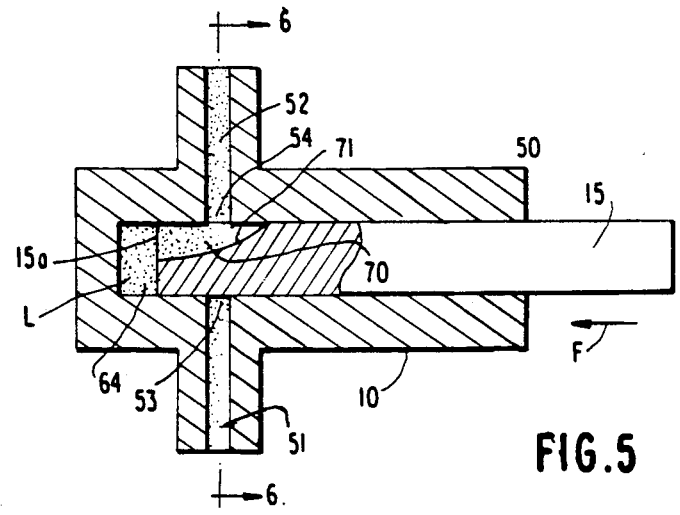
FIG. 5 is a similar schematic view of the apparatus to that of FIG. 3, with the valve open to discharge.
Figure 6:
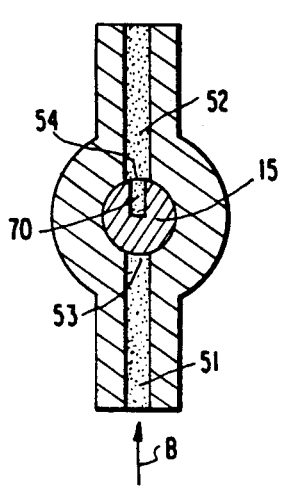
FIG. 6 is a sectional view of the apparatus of FIG. 5, taken about line 6—6.

In the drawings, FIGS. 4—6, purposely in view of their schematic nature, the cylinder liner 11 is schematically illustrated as being connected directly to the tubular portion of the cylindrical pump housing 10 at the aligned with the respective inlet port 53 and discharge port 54. As may be seen from these drawings, a key element of the improvement within this art in terms of the integral valve/positive displacement piston pump 2, resides in the creation of a elongated, quite narrow slot 70 which is formed by a rotary cutting disc aligned with the axis A' of the piston 15 at the front face 15a of the piston 15 and which creates as per FIG. 3, a arcuate or curved bottom surface 71 for the slot 70. Radial slot 70 preferably has a depth reaching the axis A' of the piston 15. The arcuate slot and indeed the use of a narrow elongated slot 70 to control valving of the pump i.e., liquid supply to the pumping chamber 64, cut off from the supply line or tube 55, and the opening of the pumping chamber to the discharge port 54 by rotation of the piston 15 about its axis A'. The employment of the arcuate slot 70 of narrow width and with a curved bottom surface 71 offers several advantages over other geometric features that could have been employed in forming such valve structure. First, because of its relatively narrow width, the slot 70 provides the option of using multi ports other than the inlet port 53 and its diametrically opposite discharge 54, such ports may take the position shown in FIG. 4, as formed by additional radial passages within the cylinder liner as at 72, 73, 74 and 75 for instance. Any one of the circumferentially spaced passages 72, 73, 74, 75 may be employed for either receiving a liquid to be pumped or discharging the same. The apparatus may use therefore multiple inlet ports receiving different types of liquid which may be dispensed sequentially through given different outlet ports for each liquid. The improved pump offers a great variety of options. The main factor limiting the number of ports which may be used is that there must an area between ports on the internal cylindrical surface of bore 50 of the cylindrical liner, the width of that area being at least equal to the diameter of the ports to ensure that the slot 70 will not communicate with more than one port at any one time.

As a result of the geometric form of the slot, the ground round, bottom surface 71 of slot 70 provides fewer internal corners for air entrapment, a condition which is detrimental to the displacement accuracy of any liquid or other fluid displacement pump. The piston 15 and the cylinder liner 11 at bore 50 are machined to provide a liquid tight, close running cylindrical fit thereby eliminating the need for reciprocating mechanical seals. Cylinder head sealing is accomplished through the use the suitable static sealing element, i.e., O-ring 63 held between the end of the cylinder liner and end cap 12 in accordance with FIG. 2. Other static seals are employed at the ends of the supply or inlet tube 5 and the discharge or delivery tube 58.

Fluid pumping is accomplished in accordance with the sequence from FIGS. 3 and 4 to that of FIGS. 5, 6. The piston 15 must be withdrawn in the direction of the double headed arrow E, FIG. 3 which parallels the axis A' of the piston 15 with that slot 70 aligned with the intake port 53. To accomplish this, the piston 15 must be rotated about its axis A' in order to position the slot 70, integral to its geometry, in a location adjacent to a through hole or passage extending radially through the wall of the cylinder liner 11, thereby creating an open path for fluid to flow from the source B, FIG. 2 to the pumping chamber 64. Moving the piston 15 in an axial direction to the right, FIG. 3 to increase the volume of the pumping chamber forces by suction, fluid to be taken in through a selected port, in this case, inlet port 53. The linear movement of the piston 15 must be limited such that its axial end face 15a stops short of the cylindrical port locations in order to assure that all ports, i.e., for passages 52, 72, 73, 74, and 75, except the one 51 selected remains valve closed. After the pumping chamber 64 is filled, the piston is rotated to a position such that the slot 70 is aligned with a discharge port. Such occurrence is seen in FIGS. 5 and 6, at which time, the liquid L from the source indicated by arrow B, FIG. 6, is cut off by the solid periphery of piston 15 and the slot 70 is aligned with the discharge port or outlet port 54 of the pump 2. The liquid accumulating within the pumping chamber 64 is forced from that pumping chamber through the discharge port 54, FIGS. 5, 6 by axial drive of the piston 15 from right to left as indicated by arrow F, FIG. 5 such that the volume of the pumping chamber is decreased. The volume discharged from the pumping chamber as indicated by arrow C, FIGS. 2, 6 is directly proportional to the linear movement of the piston 15.

Referring again to FIG. 1, and additionally to FIGS. 7 and 8, the rotary motions required for selective valving and the linear motions required for volumetric displacement, accomplished by piston 15 are created and controlled by the precision rotary/linear motion actuator mechanism 3. As may be appreciated in the schematic representation of FIG. 1, the mechanical connections of the various stand offs are effected by screw thread coupled to stand offs 4, 5, and 6 via tapped holes in the ends of the flanged circumferentially pump housing 10, the opposite end plates of the step motor 22 and the end plate 35 with threaded ends of the stand offs received within the tapped holes, or alternatively by means of screws passing through the walls of the flange cylindrical pump housing and end plate and being in turn threaded into tapped axial holes within the ends of various stand offs 4, 5, and 6. The stepping motor 22 is preferably of cylindrical form, has a squared radially outer stator indicated at 22a, and a radially inward or central rotor 22b integral with a tubular stepping motor shaft 41 extending axially to opposite sides of the stepping motor 22 and has an internal periphery which is provided with a thread 43. Thread 43 threadably engages the thread 44 of a lead screw or actuator shaft 21 which projects through the tubular stepping motor shaft 41.

The tubular shaft 41 is preferably internally tapped with the appropriate size and pitch thread 43 to mate with an external thread 44 of the externally threaded actuator shaft or lead screw 21. Shaft 21 is directly, mechanically coupled to the piston 15 of the pump 2 by means of a ball and socket flexible coupling 14. Alternatively, other suitable couplings may be employed which accommodate angular and offset axial misalignment and provide minimal rotary backlash and zero linear backlash. Further, the actuator shaft or lead screw 21 is connected to the tubular stepping motor shaft 41 via an anti-backlash nut assembly 19, FIG. 7. The tubular rotor shaft 41 is extended by a short axial length tube 80 sized to that of the rotary shaft 41, terminating in a radially enlarged flange 81. Further, an annular groove 82 of narrow width is formed within the outer periphery of the tubular rotor shaft 41, to the left side of the stepping motor 22, and axially inward from end 41b of that tubular shaft 41. A lock ring 83, of a width on the order of the annular groove 82 is carried within the groove, and functions as one abutment for a compression coil spring 84 while, the flange 81 functions as a second abutment for the opposite end of the compression coil spring 84. The inner periphery of the short axial tube 80 carries a thread 85 which is of the same size and pitch as that of 43 for the tubular rotary shaft 41. Although the anti-backlash nut assembly 19 is illustrated as being spring loaded, and comprised of a second tube 80, a structurally different anti-backlash member may be employed in the alternative to that at 19 to eliminate any axial end play of the actuator shaft 21 which may be present as a result of normal thread clearances between the internal thread 43 of the stepping motor tubular rotary shaft 41, and the thread 44 of the actuator shaft or lead screw 21.

Selective rotation or axial motion control of the lead screw 21, initiated by the stepping motor 22, is effected by utilizing the electromagnetic clutch/brake mechanism indicated generally at 42, FIG. 7. The components of that mechanism 42 are described in turn, FIG. 7, from left to right as follows. The stepping motor tubular rotor shaft 41 has a major portion thereof extending to the right of the stepping motor 22. A clutch armature indicating at 26, is fixably coupled to the tubular rotor shaft 41 by an annular collar or hub 86, which collar 86 is keyed to the shaft via key 87. Extending radially outwardly the collar 86, is a circular disc or support member 88, to which is affixed, to the side thereof, facing away from the stepping motor, the annular clutch armature 26 formed of a magnetic field transmissive material of low reluctance. The clutch armature may be formed of iron or steel. The clutch armature 26 faces a clutch rotor shaft indicated generally at 27, which is of elongated cylindrical form having a radially enlarged flange 27a at the end facing the clutch armature and having an outer periphery level with that of annular clutch armature 26. Clutch rotor shaft 27 concentrically surrounds the actuator shaft or lead screw 21 and is spaced radially therefrom. Concentrically surrounding the cylindrical clutch rotor shaft 27, and to the right of the radially enlarged flange 27a is a coil assembly indicated generally at 90 comprised of two independent coils fixedly attached to mounting plate 39 whose apertured opposed outboard edges are fixedly coupled to stand-offs 5 and 6. Two sleeve bearings 37 having at opposite ends respective radially outwardly directed flange 37a which extend upwardly about the sides of respective coils, 23, 24 are fixedly mounted in the internal bores of coils 23 and 24 and support the clutch rotor shaft. The coil to the left of the coil mounting plate 39, FIG. 7 is the stationary clutch coil 23, and that to the right is the stationary brake coil 24. Coils 23 and 24 are annular, and have an outer periphery sized to the periphery of clutch armature 26, and the flange 27a of the tubular clutch rotor shaft 27. To the right of the coil assembly 90, there is provided a collar or hub 91 which concentrically surrounds the clutch rotor shaft 27, and is fixed thereto by key 92. Collar 91 mounts to the left thereof, FIG. 7, an annular brake rotor 29 via a radial brake rotor support member or disc 93 which extends at right angles to the axis A of the apparatus 1. The brake rotor is of annular form mirroring that of the clutch armature 26, and is formed of iron, steel or like low magnetic reluctance material.

To the right of collar 91, is a flag collar or hub 94 which is fixedly coupled to the end of the clutch rotor shaft 27, remote from its radially enlarged flange 27a. A key or like mechanical coupling means at 95 keys the flag collar 94 to the clutch rotor shaft 27. The flag collar 94 carries a small sector shaped flag as at 96, which projects radially outwardly from the collar 94 and which may extend over a circumferential width of from 10° to 20°. That flag 96, projects within a radial groove or slot 97 within a U-shaped proximity sensor 30. The proximity sensor 30 is preferably a Hall Effect magnetic field sensor which will provide position information at zero speed. It senses the presence or absence of the sector shaped flag as the flag rotates circumferentially through the slot or groove 97, producing an electrical pulse, once for each rotation of the clutch rotor shaft 27 to which it is fixed.

It is important to note that the actuator shaft 21 in addition to being coupled through the anti-backlash nut assembly 19, to the stepping motor tubular rotor shaft 41, is mechanically coupled to the clutch rotor shaft 27 through a drive finger 32 which is fixed to the non-threaded end portion 21a of the actuator shaft or lead screw 21, FIG. 7. The drive finger 32 extends radially outwardly and mounts a flanged spool bushing 40 within a radial slot 32A which spool bushing is of hollow cylindrical form. The flanges 40A at opposite ends of the spool bushing 40 maintain the spool bushing within the radial slot 32A and the spool bushing has an internal diameter slightly larger than the diameter of a horizontal cylindrical drive pin 34 which projects through the interior of the spool bushing 40 and which makes sliding contact therewith. The spool bushing may slide freely on the pin 34 to move horizontally during lead screw axial movement relative to drive arm 25. The drive pin 34 projects at right angles from a radially outwardly projecting drive arm 25 which is integral with the flag collar or hub 94 or otherwise fixed at a radially inboard end to the clutch rotor shaft 27. The stationary clutch coil 23 and the stationary brake coil 24 are energized by appropriate electrical power signals emanating from a control panel, microprocessor or the like, (not shown) and through electrical terminals indicating generally at 99, 100 respectively, FIG. 7.

The drive finger 32 is keyed to the actuator shaft or lead screw 21 non-threaded portion 21a by key 98, FIG. 7. A tip 33 of the actuator shaft or lead screw 31 projects from the right end of the shaft, and is positioned so as to move towards or away from a coaxial proximity sensor 36 which detects the extreme right position of the actuator shaft 21 to allow the control electronics to establish a reference position for linear motion of the mechanically coupled piston 15. The linear position sensor 36 may be a commercially available digital position sensor manufactured by a Micro Switch of Newton, Mass. under a product designation 55SS16.

The proximity sensor 30 for sensing the rotation position of the clutch rotor shaft 27 and, upon appropriate energization of the clutch/brake mechanism 42, the rotary position of the actuator shaft driven piston 15, may be an integral magnet position sensor manufactured by Micro-Switch, under product designation 3AV2C.

FIGS. 1 and 8, show the makeup of the flexible shaft coupling 14 for coupling the actuator shaft or lead screw 21 to the piston 15 of pump 2 to provide the freedom of movement necessary to compensate for axial misalignment of axes A and A' respectively, of the actuator shaft 21 and piston 15. Since unwanted axial movement of the piston 15 is detrimental to the volumetric displacement accuracy of the liquid L being pumped by pump 2, the coupling 14 must minimize axial end play while compensating for axial misalignment. The coupling employs two side-by-side zero clearance spherical ball joints, indicated generally at 18 mutually connected through a common bearing housing 17, from a rotary drive hub 20 for the actuator lead screw shaft 21 to a rotary driven hub 48 carried by piston 15. A spherical ball 46 is fixedly coupled to a non-threaded reduced diameter end portion 21b of the actuator shaft 21. Reduced diameter portion 21b has fixed thereto, the cup-shaped rotary drive hub 20 having a pair of diametrically opposed aligned, elongated slots 20a therein. The cup-shaped rotary drive hub 20 is sized larger than the diameter of the spherical ball 46. The second, rotary cup-shaped driven hub 48 is of similar size to that at 20, and is fixed directly to the piston 15 so as to rotate with the piston 15. Upon rotation of the bearing housing 17, a second ball 47, drives piston 15 by the rotary driven hub 48 fixed thereto. Hub 48 includes diametrically opposed slots 48a similar to slots 20a of the rotary drive hub 20. The common bearing housing 17 is of annular form, and is provided with a pair of spherical grooves 100 and 102 within the inner periphery 17a of that bearing housing. The grooves are sized to the spherical balls 46, 47 and receive the same. The spherical balls may shift orthogonally such that the actuator shaft axis A is offset from the piston axis A'. Such nonalignment between the axis A, A' is permitted by the use of the drive pins 16 which are fixed to the common bearing housing 17, which project respectively radially outwardly adjacent both ends thereof, and in line with the centers of spherical grooves 100, 102. The drive pins are a length such that their outboard ends project beyond the diametrically opposed slots 20a and 48a, allowing the pins to slide within those slots but transmit rotary motion first, via one set of pins 16, from the rotary drive hub 20 to the common bearing housings 17 and from the common bearing housing 17 via a second set of pins 16, within diametrically opposed slots 48a of the rotary driven hub 48 to the hub 48 so as to drive piston 15. The zero clearance spherical ball joints 18 using the common bearing housing 17, provide not only compensation for axial misalignment, but prevent axial end play. The drive pins 16 positioned over the center of both spherical joints 18 and protruding from the common bearing housing 17 mesh with the slots 20a, 48a in the driving and driven hubs 20, 48 respectively to transmit the rotary motion necessary for valving, again, without any radial end play between the driven piston 15 and the driving actuator shaft 21.

In operation, if rotational motion control of the piston 15 is desired, as in the case during port selection, angular displacement of the actuator shaft 21 relative to the motor tubular drive shaft 41 must be inhibited. This is accomplished in part by electrically energizing stationary clutch coil 23, FIG. 7, which magnetically couples, via the resultant magnetic field, the annular clutch rotor hub 27 to the annular clutch armature 26 whose hub 86 is fixed to the stepping motor tubular drive shaft 41. Angular position of the actuator shaft 21 and consequently the piston 15 and its valving operation is determined by the number of incremental steps the rotor 22b of stepping motor 22 is rotated through, while the clutch/brake mechanism, indicated generally at 42, is in this state. The flag 96 energizes an internal magnetic, rotary vane (flag) sensing device 30 to recognize the rotational home position of the actuator shaft 21.

It should be kept in mind, that the stepping motor tubular rotor shaft 41 is originally coupled to the clutch armature 26 which acts as the clutch/brake input rotor shaft. The clutch rotor shaft 27 constitutes the clutch/brake output shaft. Energization of the stepping motor 22 via electrical leads 22c, FIG. 1 from an electrical source (not shown) causes rotation of the stepping motor rotor 22b which will cause the drive pin 34 to orbit about the coincident axis A of the clutch/brake mechanism 42. The orbiting motion of the drive pin 34 will cause the actuator shaft 21 to rotate about its own axis A which is coincident with the apparatus 1 axis. Thus, rotary motion of stepping motor rotor 22b produces an identical rotary motion in actuator shaft 21. As there is no relative rotary motion between the anti-backlash nut 19 and the external thread 44 on actuator shaft 21, there is no linear movement of actuator shaft 21, only rotary movement.

In a pumping mode, once the piston 15 is rotated sufficiently subsequent to filling the pumping chamber 64 with a supply of liquid L to be dispensed or otherwise pumped, and the piston is rotated to align the slot 70 within the piston with an appropriate discharge port, linear motion control of the actuator shaft 21 is required. Angular displacement of the actuator shaft 21 relative to the internal thread of motor tubular drive shaft must be inhibited. This is accomplished by electrically energizing stationary brake coil 24 which is attached to the actuator framework 3 and magnetically coupling it to the brake rotor 29 which is fixedly attached to the clutch rotor shaft 27. As a result, the drive pin 34 is prevented from orbiting about the axis of the clutch brake mechanism 42. Actuator shaft 21 is thus prevented from rotating about axis A but is free to move in a direction axially. As the tubular motor shaft 41 turns, it turns the anti-backlash nut 19 and the anti-backlash nut tube 80 operates on the external thread 44 of the lead screw or actuator shaft 21 to produce a linear motion of the actuator shaft in the direction which results in shifting of the piston 15 to the left in accordance with arrow F FIG. 8 along its axis A'. Such action occurs irrespective of the angular orientation, or the alignment or misalignment of actuator shaft axis A and piston axis A', FIG. 8. Reverse rotation of the stepping motor rotor 22b, results in reverse linear movement of the piston 15, i.e., opposite to the direction of arrow F, FIGS. 5, 8 under this setup. The extent of such linear movement is sensed by proximity sensor 36. It should be appreciated, that the precision linear/rotary actuator mechanism 3, is a commercially available stepping motor 22. The clutch/brake assembly 90, may be a modified and uniquely applied commercial product of Electroid Company of Springfield, N.J. under Model No. UCB-112CC-5-90VDC. The spool bushing 40 may be formed of a polyamide amide under the trade designation Torlon 4301.

The pumping apparatus 1 is capable of providing a bubble clear cycle which is highly effective to dislodge air bubbles that are caught inside the piston cylinder liner 11 upon setup of the pump or during operation should air become entrapped in the liquid being pumped. Such bubble clear cycle is initiated through a control panel, microprocessor or the like (not shown). The valving slot 70 in the piston 15 is first then rotated to a discharge port, such discharge port 54. The piston 15 is then indexed forward axially to the minimum volume condition for the pumping chamber 64. At this point, the piston 15 rotates again to turn the valving slot so that it communicates with no port. The piston 15 is then retracted to the maximum volume position. At this point there is a deep vacuum within the pump head 2A, FIG. 2 defined by the cylinder liner and the piston 15 and the end cap 15a. Once the vacuum has been created, the piston 15 then rotates to an inlet port, i.e., intake port 53. The fluidic percussion of this rapid intake of liquid L dislodges air bubbles. The valve slot 70 is then rotated to the discharge port 54 and the dislodged air and liquid are dispensed from the pump 2. The bubble clearing cycle is very useful in clearing out small as well as large bubbles and can be repeatedly recycled in the sequence above, if necessary.

The apparatus 1 is capable of dispensing extremely small volumes, such as 10 nanoliters, and volumes to 2 milliliters and more with excellent repeatability. The accuracy of displacement ranges in the area of 5 to 7% on nanoliter size dispenses to 0.1% on larger dispenses. Additionally, on the extremely small dispenses, the apparatus 1 is able to impart velocity through the dispensing mechanism and actually eject off the 25 nanoliter amount. This actual ejection of a 25 nanoliter volume of liquid L to be dispensed, is due to the stepping motor 22 drive as exemplified by this invention which has excellent acceleration on a single step. In the past, no known apparatus could achieve this type of liquid shear.

The apparatus 1 is capable of but not limited to effectively dispensing mercury for light bulbs, adhesive for semi-conductors, and biological fluids for medical diagnostic kits with the apparatus 1 being set up and accomplishing the same with minimal problems. The present invention provides multi-porting capabilities which readily allow the unit to intake and discharge liquid from several sources and to perform blending operations in complex dispensing procedures. This capability allows the user to perform the functions typically required by several pumps by a single, multi-ported dispenser, limited solely to the number of radial ports available, depending upon the size of the piston, and cylinder liner components.

With respect to the stepping motor, the preferred drive technique for the stepping motor 22 employs a mid-phase overdrive commercially available from the corporate assignee. The motor drive system provides a wide speed range without effects of resonance as well as a fast single step operation. The wide speed range for the motor 22 allows a single control unit to cover a wide range of fluid dispensing rates. Such drive provides fast and repeatable single step operations which are critical to accurate fluid dispensing in the nanoliter size. When dispensing a liquid at the smallest volume which is represented by one step of the stepping motor, it is critical to obtain a high velocity in the fluid (normally a liquid) so that the dispensed volume is cleanly ejected rather than merely forming a drop on the dispensing tip.

While the preferred configuration as shown is with an integral motor 22 having a hollow tubular motor drive shaft 41, the stepping motor 22 may be replaced with rotary transmission components such as gears or pulleys connected to a motor mounted at a different location and mechanically coupled thereto. It is preferably however, to employ a stepping motor which provides very accurate positional control at low cost. Various types of motors may be used with an appropriate shaft position sensor and control circuitry to obtain desired position control such as a DC, DC servo, brushless DC motor, etc. Further, stepping motors, such as that at 22 provide a holding torque when stopped which will prevent accidental movement of the reciprocating and rotary piston 15. If a different type of DC motor is employed, both the clutch and brake coils 23, 24 can be energized to hold the piston stationary.

While the description above is to a preferred embodiment and contains specific parameters and connection details, these should not be construed as limitations on the scope of the invention and the system in the various figures is exemplary only. The scope of the invention is determined not by the illustrated embodiment, but by the appended claims and their legal equivalents.

What is claimed is:

1. In a rotary/reciprocating liquid dispensing pump including:

a relatively stationary pump housing having means defining a smooth elongated cylindrical bore sealable closed at one end, a cylindrical piston having an outside diameter slightly less than that of said bore, sealably and slidably and rotatably mounted in said cylindrical bore and defining with said housing at said sealed off end, a pumping chamber, at least two ports within said housing opening to said bore at longitudinally aligned, circumferentially offset positions, means for supplying a liquid to be dispensed to one of said housing ports, said other port acting to receive liquid discharged from said pumping chamber, and means for selectively reciprocating and rotating said piston to effect a sequence causing liquid to be dispensed from said other of said ports in a volume and at a rate depending upon the extent of reciprocating of said piston, the improvement wherein;

an axial end face of said piston proximate to the pumping chamber includes a narrow radial slot extending longitudinally away from the pumping chamber and opening radially to the outer periphery of the piston and selectively rotatably alignable with said at least two ports and opening directly thereto, such that said two ports respectively alternatively, selectively supply a liquid to be pumped and discharge a pumped liquid therefrom, and wherein said means for selectively reciprocating and rotating said piston comprises means for selectively reciprocating said cylindrical piston bidirectionally independent of rotation of the piston through a stroke of variable length for causing a liquid to be drawn by suction into said pumping chamber and to be pumped therefrom, and means for selectively rotating said piston bidirectionally independent of reciprocation of said piston for delivery of said pumped liquid to be dispensed in a nanoliter amounts to said other of said at least two ports, and wherein the narrow radial slot has a maximum depth over at least a portion of the length of said slot reaching the axis of said cylindrical piston.

2. The pump as claimed in claim 1, wherein said elongated narrow slot, is rectangular transversely at right angles to the axis of said piston.

3. The pump as claimed in claim 1, wherein said narrow radial slot extends longitudinally from said axial end face of the piston away from the pumping chamber such that, with the pumping chamber at minimum volume, said slot is radially alignable with said at least two ports.

4. The pump as claimed in claim 1, wherein said means for selectively reciprocating said cylindrical piston bidirectionally independent of rotation of the piston and said means for selectively rotating said piston bidirectionally independent of reciprocation of said piston comprises a stepping motor, an electromagnetic clutch/braking mechanism, means operatively coupling said clutch/braking mechanism to said stepping motor, and means for energizing said electromagnetic clutch/braking mechanism for preventing axial reciprocation of said cylindrical piston during incremental rotation of said cylindrical piston, and means for preventing incremental rotation of said cylindrical piston during axial reciprocation thereof bidirectionally.

5. The pump as claimed in claim 1, wherein respective radial passages within the pump housing define said at least two circumferentially spaced ports, and said at least two circumferentially spaced ports are spaced circumferentially a distance in excess of the width of said slot.

6. The pump as claimed in claim 5, wherein said radial passages number at least three and are circumferentially spaced about the periphery of said elongated cylindrical bore and extend radially outwardly thereof.

7. The pump as claimed in claim 1, wherein said slot has a continuously curved bottom wall from said piston axial end face to the outer periphery of the piston to dislodge air bubbles from air entrapped in liquid during pumping in a bubble clear cycle.

8. The pump as claimed in claim 7, wherein respective radial passages within the pump housing define said at least two circumferentially spaced ports, and said at least two circumferentially spaced ports are spaced circumferentially a distance in excess of the width of said slot.

9. The pump as claimed in claim 7, wherein said curved bottom wall is arcuate from said axial end face to the outer periphery of the piston.

10. The pump as claimed in claim 9, wherein respective radial passages within the pump housing define said at least two circumferentially spaced ports, and said at least two circumferentially spaced ports are spaced circumferentially a distance in excess of the width of said slot.

11. Linear liquid dispensing pumping apparatus for dispensing liquid in a nanoliter volumes comprising:
a rotary/reciprocating liquid dispensing pump, said pump comprising:
a relatively stationary pump housing having means defining a smooth elongated cylindrical bore sealable closed at one end of said housing, a cylindrical piston having an outside diameter slightly less than that of said bore and sealably, slidably and rotatably mounted in said cylindrical bore and defining with said housing at said sealed end, a sealed pumping chamber,
at least two circumferentially spaced, ports within said housing opening to said bore at longitudinally aligned, circumferentially spaced positions, means for supplying a liquid to be dispensed to one of said ports, said other of said at least two ports acting to discharge liquid from said pumping chamber, said cylindrical piston including in an axial end face proximate to the pumping chamber a narrow radial slot extending longitudinally away from the pumping chamber and opening to the outer periphery of the piston and selectively alignable with said two ports, said apparatus further comprising:
a frame coupled to said pump, axially aligned therewith and projecting to one side of said pump, a stepping motor, carried by said frame, said stepping motor including a relatively fixed stator and a hollow tubular rotor coaxial with said pump piston including an integral hollow tubular rotor shaft, and axially aligned therewith, a lead screw positioned coaxially within said stepping motor hollow tubular rotor shaft, threadably engaged therewith, and axially aligned with said pump piston, an electromagnetic clutch/braking mechanism carried by said frame to one side of said stepping motor, concentrically surrounding said lead screw for selectively operatably coupling said lead screw to said stepping motor tubular rotor shaft, a flexible coupling connecting an end of said lead screw proximate to said pump to said slidably and rotatably mounted piston, an anti-backlash assembly operatively coupling said stepping motor rotor to said lead screw, means for driving said stepping motor tubular rotor shaft incrementally, and means for energizing said electromagnetic clutch/braking mechanism to effect selective, incremental rotation of said cylindrical piston and axial reciprocation thereof bidirectionally for delivery of a liquid to be dispensed in nanoliter amounts to said other of said at least two ports.

12. The pumping apparatus as claimed in claim 11, wherein said lead screw has a threaded outer peripheral portion i mesh with an internal thread on the inner periphery of said stepping motor hollow tubular rotor shaft such that, with the clutch stationary coil being energized, the stepping motor tubular rotor shaft incrementally drives the lead screw axially thereby shifting the longitudinal position of the piston within the housing cylindrical bore of said pump.

13. The pumping apparatus as claimed in claim 11, wherein said anti-backlash means comprises an anti-backlash assembly coupling said tubular stepping motor shaft to said lead screw.

14. The pumping apparatus as claimed in claim 11, wherein said means for energizing said electromagnetic clutch/braking mechanism comprises means for preventing axial reciprocation of said cylindrical piston during incremental rotation of said cylindrical piston, and means for preventing incremental rotation of said cylindrical piston during axial reciprocation thereof bidirectionally.

15. The pumping apparatus as claimed in claim 11, wherein said flexible coupling comprises a ball and socket coupling minimizing angular backlash and preventing axial end play between said lead screw, and the pump piston.

16. The pumping apparatus as claimed in claim 15, wherein said ball and socket coupling comprises a cup-shaped rotary drive hub fixedly mounted to said lead screw having an open end thereof at an end thereof proximate to the pump piston, and facing the pump piston, a complementary cup-shaped rotary driven hub fixedly mounted to said piston having an open end thereof facing an open end of said cup-shaped rotary drive hub, a cylindrical common bearing housing axially interposed between said oppositely facing rotary drive hub and rotary driven hub, said lead screw, and said piston terminating in spherical balls positioned within opposite respective ends of said common bearing housing, and partially within respective spherical grooves on the inner periphery of the common cylindrical tubular bearing housing, sets of diametrically opposed, longitudinal slots within the open ends of said cup-shaped rotary drive hub and said cup-shaped rotary driven hub, drive pins fixedly mounted to said common bearing housing, projecting radially outwardly of the outer periphery of the tubular common bearing housing, being of a length and being positioned within said diametrically opposed slots of said cup-shaped rotary drive and rotary driven hubs, whereby end play is eliminated between the ends of said pump piston and said lead screw proximate to each other while permitting angular misalignment between the axis of the pump piston, and that of the lead screw.

17. The pumping apparatus as claimed in claim 11, wherein said pump housing is a cylindrical member, having a radially enlarged flange at one end, said open frame comprises a plurality of circumferentially spaced standoffs, fixedly mounted between the flange of the cylindrical pump housing and the side of the stepping motor proximate to that of the pump, and wherein, an end plate is fixedly mounted to the other side of said stepping motor via circumferentially spaced standoffs projecting from the opposite side of the stepping motor to that facing said pump, and connected at ends remote from the stepping motor, to said end plate.

18. The pumping apparatus as claimed in claim 17, wherein said end plate carries a lead screw axial shift proximity sensor coaxially with the axis of said lead screw and facing the end of said lead screw, remote from said pump piston such that incremental axial shifting of the lead screw by relative rotation of the stepping motor tubular rotor shaft and said lead screw is sensed by said proximity sensor carried by said end plate.

19. The pumping apparatus as claimed in claim 11, wherein said anti-backlash assembly is an anti-backlash nut comprising a short axial length hollow tube sized to said tubular stepping motor tubular rotor shaft, having a threaded inner periphery with a thread of a pitch equal to that of the stepping motor tubular rotor and wherein, a coil spring is concentrically mounted about the portion of said stepping motor tubular rotor shaft, and said short axial length tube and means carried by said tubular rotor shaft and said short axial length tube length for maintaining said spring under axial compression, thereby eliminating any axial end play of the stepping motor rotor shaft and the lead screw as a result of the normal thread clearances between the internal thread of the stepping motor tubular rotor shaft and the outer peripheral thread of the lead screw.

20. The pumping apparatus as claimed in claim 19, wherein said the short axial length tube has a flange on an end thereof remote from said stepping motor tubular rotor shaft, and said tubular rotor includes an annular ring extending radially outwardly thereof and wherein, said compression coil spring is of a diameter on the order of the outer diameter of said stepping motor tubular rotor shaft and that of said short axial length tube and is axially interposed between the integral flange of said short axial length tube and said radially projecting ring of said stepping motor tubular motor rotor shaft.

21. The pumping apparatus as claimed in claim 20, wherein said stepping motor tubular rotor shaft includes a circumferential groove within the periphery thereof axially inwardly of the end of the stepping motor tubular rotor proximate to said short axial length tube, and wherein said radially projecting ring comprises a annular lock ring of a width on the order of said of the said annular groove and being mounted therein.

22. The pumping apparatus as claimed in claim 11, wherein said clutch/brake mechanism comprises a tubular clutch rotor concentrically surrounding said lead screw, and including a radial flange at an axial end proximate to said stepping motor and said hollow tubular stepping motor rotor, a first, clutch stationary coil of annular form fixedly mounted to said frame, concentrically surrounding said tubular clutch rotor, and a brake stationary coil fixedly mounted to said frame laterally adjacent said clutch stationary coil, a clutch armature fixedly mounted to said stepping motor tubular rotor shaft and positioned adjacent to and facing the flange of said tubular clutch rotor shaft and wherein, said clutch armature and said tubular clutch rotor flange being formed of a low reluctance material such that, upon energization of the clutch stationary coil, a magnetic field attraction occurs between the clutch armature of said tubular stepping motor rotor shaft and said tubular clutch rotor flange so as to drive the clutch tubular rotor, and wherein said apparatus further comprises means operatively coupling said tubular clutch rotor to said lead screw for causing the lead screw to rotate about its axis upon energization of the clutch stationary coil during operation of said stepping motor.

23. The pumping apparatus as claimed in claim 22, wherein said means operatively coupling said tubular clutch rotor to said lead screw, comprises a radial drive arm fixed to said tubular clutch rotor remote from the flange thereof and extending radially outwardly thereof, a cylindrical pin fixedly mounted to a radially outboard end of said drive arm, at right angles thereto, and projecting parallel to the axis of the hollow tubular clutch rotor and said lead screw, and, a drive finger fixedly mounted to said lead screw, extending radially outwardly therefrom and terminating in a cylindrical spool bushing concentrically surrounding and slidably mounted on said drive pin whereby, during axial movement of the lead screw, the spool bushing is free to move longitudinally towards and away from said drive arm fixedly carried by said tubular clutch rotor.

24. The pumping apparatus as claimed in claim 22, wherein said clutch/brake mechanism further comprises an annular brake rotor, fixed to said tubular clutch rotor to the side of said stationary brake coil axially remote from said clutch stationary coil, and wherein, said brake rotor is formed of a low magnetic reluctance material such that upon energization of the stationary brake coil, the brake rotor is prevented from rotation thereby preventing relative rotation between said clutch rotor shaft and said lead screw, whereby, upon rotation of said tubular stepping motor rotor shaft incremental axial shifting of said lead screw threaded thereto is effected to incrementally shift the pump piston directionally, depending upon the direction of rotation of said stepping motor hollow tubular rotor.

25. The pumping apparatus as claimed in claim 22, further comprising a lead screw rotation proximity sensor operatively carried by said frame and mounted in proximity to said tubular clutch rotor, and wherein said proximity sensor comprises a flag projecting radially outwardly from said tubular clutch rotor and rotatable therewith and over a limited circumferential width, and, an electromagnetic coil positioned in the vicinity of the path of movement of said flag, and wherein, the flag is of a magnetic material such that during each rotation of the tubular clutch rotor, an electrical pulse is created within each electromagnetic coil indicative of a cycle of rotation of said tubular clutch rotor.

26. Linear liquid dispensing pumping apparatus for dispensing liquid in a nanoliter volumes comprising:
 a rotary/reciprocating liquid dispensing pump, said pump comprising:
 a relatively stationary pump housing having means defining a smooth elongated cylindrical bore sealable closed at one end of said housing, a cylindrical piston having an outside diameter slightly less than that of said bore and sealably, slidably and rotatably mounted in said cylindrical bore and defining with said housing at said sealed end, a sealed pumping chamber,
 at least two circumferentially spaced, ports within said housing opening to said bore at longitudinally aligned, circumferentially spaced positions, means for supplying a liquid to be dispensed to one of said ports, said other of said at least two ports acting to discharge liquid from said pumping chamber, said cylindrical piston including in an axial end face proximate to the pumping chamber a narrow radial slot extending longitudinally away from the pumping chamber and opening to the outer periphery of the piston and selectively alignable with said two ports, said apparatus further comprising:
 a frame coupled to said pump, axially aligned therewith and projecting to one side of said pump, a motor, carried by said frame, said motor including a relatively fixed stator and a hollow tubular rotor coaxial with said pump piston including an integral hollow tubular rotor shaft, and axially aligned therewith, a lead screw positioned coaxially within said motor hollow tubular rotor shaft, threadably engaged therewith, and axially aligned with said pump piston, an electromagnetic clutch/braking mechanism carried by said frame to one side of said motor, concentrically surrounding said lead screw for selectively operatably coupling said lead screw to said motor tubular rotor shaft, a flexible coupling connecting an end of said lead screw proximate to said pump to said slidably and rotatably mounted piston, an anti-backlash assembly operatively coupling said motor rotor to said lead screw, means for driving said motor tubular rotor shaft, and means for energizing said electromagnetic clutch/braking mechanism to effect selective, controlled rotation of said cylindrical piston and axial reciprocation thereof bidirectionally for delivery of a liquid to be dispensed in nanoliter amounts to said other of said at least two ports.

27. The pumping apparatus as claimed in claim 26, wherein said flexible coupling comprises a ball and socket coupling minimizing angular backlash and preventing axial end play between said lead screw, and the pump piston.

28. The pumping apparatus as claimed in claim 26, wherein said ball and socket coupling comprises a cup-shaped rotary drive hub fixedly mounted to said lead screw having an open end thereof at an end thereof proximate to the pump piston, and facing the pump piston, a complementary cup-shaped rotary driven hub fixedly mounted to said piston having an open end thereof facing an open end of said cup-shaped rotary drive hub, a cylindrical common bearing housing axially interposed between said oppositely facing rotary drive hub and rotary driven hub, said lead screw, and said piston terminating in spherical balls positioned within opposite respective ends of said common bearing housing, and partially within respective spherical grooves on the inner periphery of the common cylindrical tubular bearing housing, sets of diametrically opposed, longitudinal slots within the open ends of said cup-shaped rotary drive hub and said cup-shaped rotary driven hub, drive pins fixedly mounted to said common bearing housing, projecting radially outwardly of the outer periphery of the tubular common bearing housing, being of a length and being positioned within said diametrically opposed slots of said cup-shaped rotary drive and rotary driven hubs, whereby end play is eliminated between the ends of said pump piston and said lead screw proximate to each other while permitting angular misalignment between the axis of the pump piston, and that of the lead screw.

29. The pumping apparatus as claimed in claim 26, wherein said lead screw has a threaded outer peripheral portion in mesh with an internal thread on the inner periphery of said motor hollow tubular rotor shaft such that, with the clutch stationary coil being energized, the motor tubular rotor shaft drives the lead screw axially thereby shifting the longitudinal position of the piston within the housing cylindrical bore of said pump.

30. The pumping apparatus as claimed in claim 26, wherein said anti-backlash means comprises an anti-backlash assembly coupling said tubular motor shaft to said lead screw.

31. The pumping apparatus as claimed in claim 26, wherein said pump housing is a cylindrical member, having a radially enlarged flange at one end, said open frame comprises a plurality of circumferentially spaced standoffs, fixedly mounted between the flange of the cylindrical pump housing and the side of the motor proximate to that of the pump, and wherein, an end plate is fixedly mounted to the other side of said motor via circumferentially spaced standoffs projecting from the opposite side of the stepping motor to that facing said pump, and connected at ends remote from the motor, to said end plate.

32. The pumping apparatus as claimed in claim 31, wherein said end plate carries a lead screw axial shift proximity sensor coaxially with the axis of said lead screw and facing the end of said lead screw, remote from said pump piston such that incremental axial shifting of the lead screw by relative rotation of the motor tubular rotor shaft and said lead screw is sensed by said proximity sensor carried by said end plate.

33. The pumping apparatus as claimed in claim 26, wherein said anti-backlash assembly is an anti-backlash nut comprising a short axial length hollow tube sized to said tubular motor tubular rotor shaft, having a threaded inner periphery with a thread of a pitch equal to that of the motor tubular rotor and wherein, a coil spring is concentrically mounted about the portion of said motor tubular rotor shaft, and said short axial length tube and means carried by said tubular rotor shaft and said short axial length tube therein for maintaining said spring under axial compression, thereby eliminating any axial end play of the motor rotor shaft and the lead screw as a result of the normal thread clearances between the internal thread of the motor tubular rotor shaft and the outer peripheral thread of the lead screw.

34. The pumping apparatus as claimed in claim 33, wherein said the short axial length tube has a flange on an end thereof remote from said motor tubular rotor shaft, and said tubular rotor includes an annular ring extending radially outwardly thereof and wherein, said compression coil spring is of a diameter on the order of the outer diameter of said motor tubular rotor shaft and that of said short axial length tube and is axially interposed between the integral flange of said short axial length tube and said radially projecting ring of said motor tubular motor rotor shaft.

35. The pumping apparatus as claimed in claim 34, wherein said motor tubular rotor shaft includes a circumferential groove within the periphery thereof axially inwardly of the end of the motor tubular rotor proximate to said short axial length tube, and wherein said radially projecting ring comprises a annular lock ring of a width on the order of said of the said annular groove and being mounted therein.

36. The pumping apparatus as claimed in claim 26, wherein said clutch/brake mechanism comprises a tubular clutch rotor concentrically surrounding said lead screw, and including a radial flange at an axial end proximate to said motor and said hollow tubular motor rotor, a first, clutch stationary coil of annular form fixedly mounted to said frame, concentrically surrounding said tubular clutch rotor, and a brake stationary coil fixedly mounted to said frame laterally adjacent said clutch stationary coil, a clutch armature fixedly mounted to said motor tubular rotor shaft and positioned adjacent to and facing the flange of said tubular clutch rotor shaft and wherein, said clutch armature and said tubular clutch rotor flange being formed of a low reluctance material such that, upon energization of the clutch stationary coil, a magnetic field attraction occurs between the clutch armature of said tubular motor rotor shaft and said tubular clutch rotor flange so as to drive the clutch tubular rotor, and wherein said apparatus further comprises means operatively coupling said tubular clutch rotor to said lead screw for causing the lead screw to rotate about its axis upon energization of the clutch stationary coil during operation of said motor.

37. The pumping apparatus as claimed in claim 36, wherein said means operatively coupling said tubular clutch rotor to said lead screw, comprises a radial drive arm fixed to said tubular clutch rotor remote from the flange thereof and extending radially outwardly thereof, a cylindrical pin fixedly mounted to a radially outboard end of said drive arm, at right angles thereto, and projecting parallel to the axis of the hollow tubular clutch rotor and said lead screw, and, a drive finger fixedly mounted to said lead screw, extending radially outwardly therefrom and terminating in a cylindrical spool bushing concentrically surrounding and slidably mounted on said drive pin whereby, during axial movement of the lead screw, the spool bushing is free to move longitudinally towards and away from said drive arm fixedly carried by said tubular clutch rotor.

38. The pumping apparatus as claimed in claim 36, wherein said clutch/brake mechanism further comprises an annular brake rotor, fixed to said tubular clutch rotor to the side of said stationary brake coil axially remote from said clutch stationary coil, and wherein, said brake rotor is formed of a low magnetic reluctance material such that upon energization of the stationary brake coil, the brake rotor is prevented from rotation thereby preventing relative rotation between said clutch rotor shaft and said lead screw, whereby, upon rotation of said tubular motor rotor shaft axial shifting of said lead screw threaded thereto is effected to shift the pump piston bidirectionally, depending upon the direction of rotation of said motor hollow tubular rotor.

39. The pumping apparatus as claimed in claim 36, further comprising a lead screw rotation proximity sensor operatively carried by said frame and mounted in proximity to said tubular clutch rotor, and wherein said proximity sensor comprises a flag projecting radially outwardly from said tubular clutch rotor and rotatable therewith and over a limited circumferential width, and, an electromagnetic coil positioned in the vicinity of the path of movement of said flag, and wherein, the flag is of a magnetic material such that during each rotation of the tubular clutch rotor, an electrical pulse is created within said electromagnetic coil indicative of a cycle of rotation of said tubular clutch rotor.

* * * * *